US008643828B2

(12) United States Patent
Ohtomo et al.

(10) Patent No.: US 8,643,828 B2
(45) Date of Patent: Feb. 4, 2014

(54) LASER SURVEYING INSTRUMENT (75) Inventors: Fumio Ohtomo, Tokyo-to (JP); Kaoru Kumagai, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 99 days.

(21) Appl. No.: 13/276,519

(22) Filed: Oct. 19, 2011

(65) Prior Publication Data

US 2012/0105824 A1    May 3, 2012

(30) Foreign Application Priority Data

Oct. 27, 2010    (JP) .................................. 2010-241061

(51) Int. Cl.
*G01C 3/08*    (2006.01)
(52) U.S. Cl.
USPC .......................... 356/5.01; 356/3.01; 356/4.01
(58) Field of Classification Search
USPC ............................................... 356/3.01–28.5
See application file for complete search history.

(56) References Cited

U.S. PATENT DOCUMENTS

| 4,861,131 | A | 8/1989 | Bois et al. |
| 5,532,813 | A | 7/1996 | Ohishi et al. |
| 6,504,602 | B1 * | 1/2003 | Hinderling ..................... 356/5.1 |
| 8,218,131 | B2 | 7/2012 | Otani et al. |
| 2003/0137449 | A1 | 7/2003 | Vashisth et al. |
| 2005/0213808 | A1 | 9/2005 | Ohtomo et al. |
| 2006/0188143 | A1 | 8/2006 | Strassenburg-Kleciak |
| 2008/0075325 | A1 | 3/2008 | Otani et al. |
| 2009/0296071 | A1 * | 12/2009 | Fukumoto ..................... 356/5.01 |
| 2012/0013917 | A1 | 1/2012 | Ohtomo et al. |

FOREIGN PATENT DOCUMENTS

| JP | 6-214027 A | 8/1994 |
| JP | 7-159538 A | 6/1995 |
| JP | 2002-31528 A | 1/2002 |
| JP | 2004-37127 A | 2/2004 |
| JP | 2004-37396 A | 2/2004 |
| JP | 2004-163292 A | 6/2004 |
| JP | 2004-317237 A | 11/2004 |
| JP | 2004-361315 A | 12/2004 |
| JP | 2005-283221 A | 10/2005 |
| JP | 2008-76303 A | 4/2008 |
| WO | 97/40342 A2 | 10/1997 |

OTHER PUBLICATIONS

Final Rejection dated Dec. 19, 2011 in co-pending U.S. Appl. No. 11/891,382.

(Continued)

*Primary Examiner* — Luke Ratcliffe
(74) *Attorney, Agent, or Firm* — Nields, Lemack & Frame, LLC (57) ABSTRACT

A laser surveying instrument comprising a light source unit having two or more light emission sources for emitting pulsed distance measuring lights with different wavelengths, a light projecting unit for projecting the pulsed distance measuring lights with the two or more wavelengths on an optical axis, and a deflection member provided on the optical axis, is disclosed. The deflection member has two or more reflection surfaces which reflect each wavelength of the pulsed distance measuring lights independently, thereby dividing the pulsed distance measuring lights for every wavelength, and deflecting each of the distance measuring lights toward an object to be measured. The instrument comprises a single photodetection element for receiving reflected distance measuring lights from the object to be measured. In the laser surveying instrument, a measurement of distance is performed for every pulsed distance measuring light based on a photodetection signal produced by the photodetection element.

10 Claims, 9 Drawing Sheets

(56) References Cited

OTHER PUBLICATIONS

Office Action mailed Apr. 26, 2013 in co-pending U.S. Appl. No. 13/158,800.
European Communication dated Jul. 3, 2009 in co-pending foreign patent application No. EP 07018456.9.
Office Action mailed Jul. 28, 2011 in co-pending U.S. Appl. No. 11/891,382.
Japanese Communication, with English translation, mailed Nov. 29, 2011 in co-pending Japanese Patent Application No. 2006-257712.
Notice of Allowance mailed Mar. 26, 2012 in co-pending U.S. Appl. No. 11/891,382.
European Communication mailed Mar. 14, 2012 in co-pending European Patent Application No. 07018456.9.
Notice of Allowance mailed Sep. 26, 2013 in co-pending U.S. Appl. No. 13/158,800.

* cited by examiner

LASER SURVEYING INSTRUMENT

BACKGROUND OF THE INVENTION

The present invention relates to a laser surveying instrument to measure multiple points in regard to an object to be measured at a high speed and to acquire point group data.

To acquire three-dimensional data of the object to be measured, the point group data in regard to the object to be measured is acquired. As one of measuring devices which acquire the point group data, there is a laser scanner. For example, Japanese Patent Application Publication JP-A-2008-76303 discloses a laser scanner comprising a deflection mirror which rotates around a horizontal axis in an elevation direction and also rotates around a vertical axis in a horizontal direction and a light projecting optical system which has an optical axis coinciding with the vertical axis and projects a pulsed distance measuring light to the optical axis.

In the laser scanner, the pulsed distance measuring light emitted from the light projecting optical system is subjected to a reciprocating scan in the elevation direction at a predetermined angle by the deflection mirror, the deflection mirror is rotated to project the pulsed distance measuring light in a total circumferential direction, a reflection light of the pulsed distance measuring light is received to perform a distance measurement for every pulsed distance measuring light, thereby acquiring the point group data in regard to the total circumferential direction.

Further, the laser scanner is mounted in a moving object such as an automobile together with an image pickup device, and the laser scanner acquires an image and the point group data while moving to acquire an image with the three-dimensional data. Furthermore, in order to enable the more precise and more real modeling, the density growth of the point group data is demanded.

Alternatively, considering a situation that a trouble occurs in the measurement, e.g., that an obstacle such as an automobile blocks a laser during the measurement, a further increase in speed for acquiring the point group data has been demanded.

The current demand for an increase in speed for acquiring the point group data is met by increasing in light emission frequency of a light-emitting diode which emits a pulse and by realizing high-speed rotation of a deflection mirror which scans a pulse laser.

However, it cannot be said that the demand for an increase in speed is sufficiently met because of a limit of an increase in the light emission frequency due to a light emission duty ratio of the light-emitting diode, and because of a limit of a reduction in weight of the deflection mirror and a limit of an increase in speed of a driving motor, and others. Moreover, to meet the demand for the increase in speed, an increase in cost is an obstacle because a high-quality light-emitting diode is required and an increase in speed of a driving mechanism for the deflection mirror should be satisfied, for example.

SUMMARY OF THE INVENTION

It is an object of the present invention to provide a laser surveying instrument which easily enables an increase in speed for acquiring the point group data.

To attain the above object, a laser surveying instrument according to the present invention comprises a light source unit which has two or more light emission sources for emitting pulsed distance measuring lights with different wavelengths, a pulse driving unit for performing time sharing and emitting the pulsed distance measuring lights for every wavelength, a light projecting unit for projecting the pulsed distance measuring lights with the two or more wavelengths on an optical axis, a deflection member which is provided on the optical axis, has two or more reflection surfaces which reflect each wavelength of the pulsed distance measuring lights alone, divides the pulsed distance measuring lights for every wavelength, and deflects each of the distance measuring lights to direct an object to be measured, and a single photodetection element for receiving reflected distance measuring lights from the object to be measured, and in the laser surveying instrument, a measurement of distance is performed or every pulsed distance measuring light based on a photodetection signal produced by the photodetection element.

Further, in the laser surveying instrument according to the present invention, the two or more reflection surfaces of the deflection member tilt with respect to the optical axis, and the reflection surfaces have tilt angles which are different from each other.

Further, in the laser surveying instrument according to the present invention, the two or more reflection surfaces of the deflection member divide and deflect the pulsed distance measuring lights so as to have different horizontal angles.

Further, in the laser surveying instrument according to the present invention, the two or more reflection surfaces of the deflection member divide and deflect the pulsed distance measuring lights so as to have different vertical angles.

Further, in the laser surveying instrument according to the present invention, the deflection member has the two reflection surfaces, and the reflection surfaces cross each other and symmetrically tilt with respect to the optical axis.

Further, in the laser surveying instrument according to the present invention, the deflection member is provided on two or more stages along the optical axis in such a manner that one deflection member is placed at a position rotated around the optical axis from the other deflection member.

Further, in the laser surveying instrument according to the present invention, the deflection member has the four reflection surfaces, and the reflection surfaces are formed to cross each other and each of the reflection surfaces has different horizontal direction, respectively.

Further, in the laser surveying instrument according to the present invention, the reflection surface is formed by a planar mirror and the reflection surface is formed by a prism.

Furthermore, in the laser surveying instrument according to the present invention, the deflection member is rotatable around the optical axis and a horizontal angle detector, which detects a rotational angle of the deflection member, is provided, and the horizontal angle detector detects a projecting direction of the pulsed distance measuring light, and the detected projecting direction is associated with a distance measurement result.

According to the present invention, the laser surveying instrument comprises a light source unit which has two or more light emission sources for emitting pulsed distance measuring lights with different wavelengths, a pulse driving unit for performing time sharing and emitting the pulsed distance measuring lights for every wavelength, a light projecting unit for projecting the pulsed distance measuring lights with the two or more wavelengths on an optical axis, a deflection member which is provided on the optical axis, has two or more reflection surfaces which reflect each wavelength of the pulsed distance measuring lights alone, divides the pulsed distance measuring lights for every wavelength, and deflects each of the distance measuring lights to direct an object to be measured, and a single photodetection element for receiving reflected distance measuring lights from the object to be measured, and in the laser surveying instrument, a measurement of distance is performed for every pulsed distance measuring light based on a photodetection signal produced by the photodetection element. As a result, the number of light emission frequencies can be increased without increasing the light emission duty ratio per light emission source and the speed for acquiring the point group data can be increased.

Further, according to the present invention, in the laser surveying instrument, the two or more reflection surfaces of the deflection member tilt with respect to the optical axis, and the reflection surfaces have tilt angles which are different from each other. As a result, a plurality of measuring points having different directions can be measured at the same time.

Further, according to the present invention, in the laser surveying instrument, the two or more reflection surfaces of the deflection member divide and deflect the pulsed distance measuring lights so as to have different horizontal angles. As a result, a plurality of measuring points having the different horizontal angles can be measured at the same time.

Further, according to the present invention, in the laser surveying instrument, the two or more reflection surfaces of the deflection member divide and deflect the pulsed distance measuring lights so as to have different vertical angles. As a result, a plurality of measuring points having different heights in the same direction can be measured at the same time.

Further, according to the present invention, in the laser surveying instrument, the deflection member has the two reflection surfaces, and the reflection surfaces cross each other and symmetrically tilt with respect to the optical axis. As a result, the measuring points having the 180° different horizontal directions can be measured at the same time.

Further, according to the present invention, in the laser surveying instrument, the deflection member is provided on two or more stages along the optical axis in such a manner that one deflection member is placed at a position rotated around the optical axis from the other deflection member. As a result, the number of reflection surfaces can be increased, a light emission duty ratio per light emission source can be reduced, more measuring points can be thereby measured at the same time, the number of light emission frequencies can be increased, and a speed for acquiring the point group data can be increased.

Furthermore, according to the present invention, in the laser surveying instrument, the deflection member is rotatable around the optical axis and a horizontal angle detector, which detects a rotational angle of the deflection member, is provided, and the horizontal angle detector detects a projecting direction of the pulsed distance measuring light, and the detected projecting direction is associated with a distance measurement result. As a result, the point group data can be acquired at a high speed in wide range.

BRIEF DESCRIPTION OF THE DRAWINGS

FIG. 3(A), FIG. 3(B), and FIG. 3(C) are explanatory drawings showing a relationship between a light emission state of a pulsed distance measuring light and the photodetection signal.

DETAILED DESCRIPTION OF THE PREFERRED EMBODIMENTS

Description will be given below on an embodiment of the present invention by referring to the attached drawings.

First, in FIG. 1, description will be given on a basic configuration of a laser surveying instrument 1 according to the present embodiment.

Figure 1:
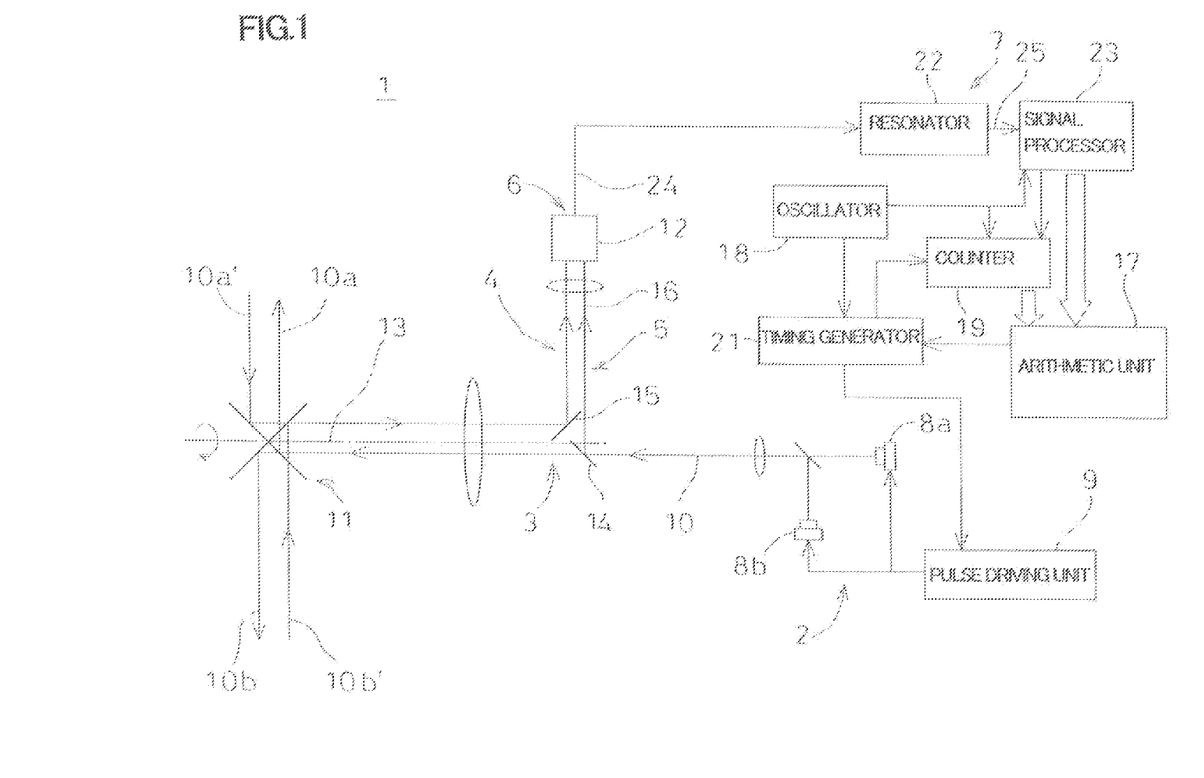
FIG. 1 is a schematic block diagram showing an embodiment according to the present invention.

In FIG. 1, reference numeral 2 represents a light source unit, 3 represents a light projecting optical system, 4 represents a light receiving optical system, 5 represents an internal reference optical system, 6 represents a light receiving unit and 7 represents a control unit.

The light source unit 2 has two pulse laser diodes (hereinafter referred as PLDs) 8a and 8b as light emission sources and a pulse driving unit 9 as means for allowing each PLD to perform pulsed light emission independently. The PLDs 8a and 8b are aligned on an optical axis at a predetermined interval, are respectively driven by the pulse driving unit 9 and emit the pulsed laser beams having different wavelengths. Here, a wavelength of the pulsed laser beam emitted from the PLD 8a is, e.g., 900 nm, and a wavelength of the pulsed laser beam emitted from the PLD 8b is, e.g., 850 nm. Further, here, the PLD 8b is arranged in such a manner that the PLD 8b emits the pulsed laser beam in a perpendicular direction to the PLD 8a, and an optical axis of the PLD 8b is deflected by using a deflection member so that the pulsed laser beams are projected on the same optical axis.

A deflection member 11 is installed on an optical axis 13 of the light projecting optical system 3, and the deflection member 11 is provided to be capable of rotating around the optical axis 13. Furthermore, an angle detector (not shown) such as an encoder is provided to a support portion of the deflection member 11 so as to measure a rotating angle of the deflection member 11.

The deflection member 11 has two reflection surfaces which are perpendicular to each other, and each of the two reflection surfaces tilts 45° with respect to the optical axis 13. Moreover, on each of the two reflection surfaces, a wavelength selecting film which reflects a specific wavelength alone is formed and, for example, one reflection surface is characterized by reflecting a wavelength of 900 nm±20 nm and transmitting any other wavelengths therethrough, while the other reflection surface is characterized by reflecting a wavelength of 850 nm±20 nm and transmitting any other wavelengths therethrough.

Each of the pulsed laser beams emitted from the PLDs 8a and 8b is projected to the optical axis 13 as pulsed distance measuring lights 10a and 10b (hereinafter referred as a pulsed distance measuring light 10 when these lights 10a and 10b are generically designated as a pulsed distance measuring light), the pulsed laser beams are divided into the pulsed distance measuring lights 10a and 10b by the deflection member 11, the pulsed distance measuring lights 10a and 10b are deflected in the perpendicular directions to the optical axis 13, and the deflected pulsed distance measuring lights 10a and 10b are projected to the object to be measured. Moreover, the pulsed distance measuring light 10a and the pulsed distance measuring light 10b are projected in directions which are 180° different from each other via the deflection member 11.

The pulsed distance measuring lights 10a and 10b projected from the deflection member 11 are reflected by the object to be measured and are entered to the deflection member 11 as reflected pulsed distance measuring lights 10a' and 10b', and these lights 10a' and 10b' are reflected to the optical axis 13.

When the reflected pulsed distance measuring lights 10a' and 10b' (hereinafter referred as a reflected pulsed distance measuring light 10' when the reflected pulsed distance measuring lights are generically designated) reflected by the deflection member 11 are further deflected by a reflection mirror 15 and are received by a photodetection element 12.

A part of the pulsed distance measuring light 10 is reflected by a half-mirror 14, and the reflected part is received by the photodetection element 12 as an internal reference light 16.

Here, the half-mirror 14 and an optical member (not shown) which leads the internal reference light 16 reflected by the half-mirror 14 to the photodetection element 12 constitute the internal reference optical system 5.

The control unit 7 has an arithmetic unit 17, an oscillator 18, a counter 19, a timing generator 21, a resonator 22, and a signal processor 23.

A clock signal produced from the oscillator 18 is input to the timing generator 21, the counter 19, and the signal processor 23.

The timing generator 21 determines the light emission timing for the PLDs 8a and 8b based on the clock signal from the oscillator 18 and transmits a timing signal to the pulse driving unit 9. The pulse driving unit 9 performs time sharing with respect to the PLDs 8a and 8b at predetermined time intervals based on the timing signal and allows the PLDs 8a and 8b to alternately emit the lights. It is to be noted that this time interval is set to be longer than a time required for the pulsed distance measuring light 10 to go and return a distance to the object to be measured.

Figure 2A:
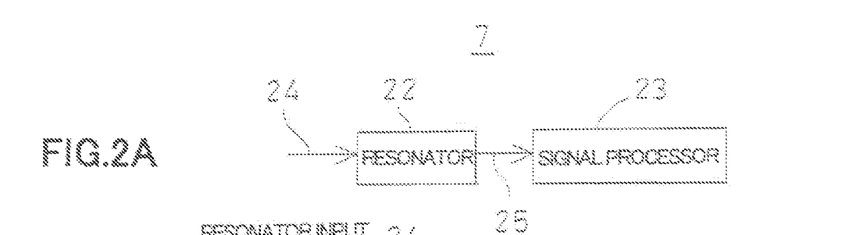
FIG. 2(A), FIG. 2(B), and FIG. 2(C) are explanatory drawings showing a state of a photodetection signal.
Figure 2B:
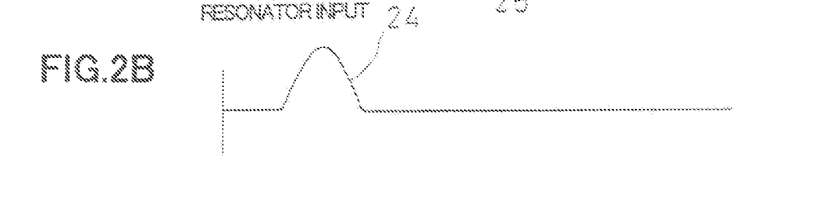

When the photodetection element 12 detects the reflected pulsed distance measuring light 10', a photodetection signal 24 is produced, and the photodetection signal 24 is input to the resonator 22 (see FIGS. 2(A) and (B)). The resonator 22 forms an attenuation waveform 25 based on the photodetection signal 24 and outputs the attenuation waveform 25 to the signal processor 23 (see FIG. 2(C)). The signal processor 23 detects a time point To at which the attenuation waveform 25 has turned to a 0 level for the first time, and a detection signal is transmitted to the counter 19 and further supplied to the arithmetic unit 17.

Figure 2C:
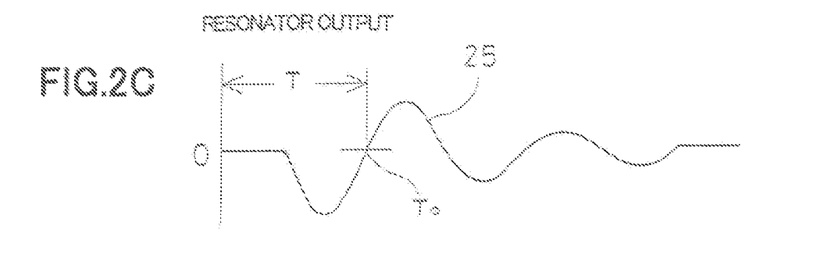

Additionally, the internal reference light 16 which has passed through the internal reference optical system 5 enters the photodetection element 12, and the photodetection signal 24 of the internal reference light 16 is input to the resonator 22. Like the situation where the reflected pulsed distance measuring light 10' has been detected, the resonator 22 outputs the attenuation waveform 25, and a detection signal of a time point Ti at which the signal processor 23 has detected the 0 level for the first time is transmitted to the arithmetic unit 17.

A light emission timing signal is input to the arithmetic unit 17 via the counter 19, and the arithmetic unit 17 calculates times from the light emission of the PLDs 8 to time points of the detection of To and Ti and calculates a time difference ΔT of (To−Ti). Based on this ΔT, a distance to the object to be measured is determined.

Based on each pulsed distance measuring light 10, each distance is determined.

Figure 3A:
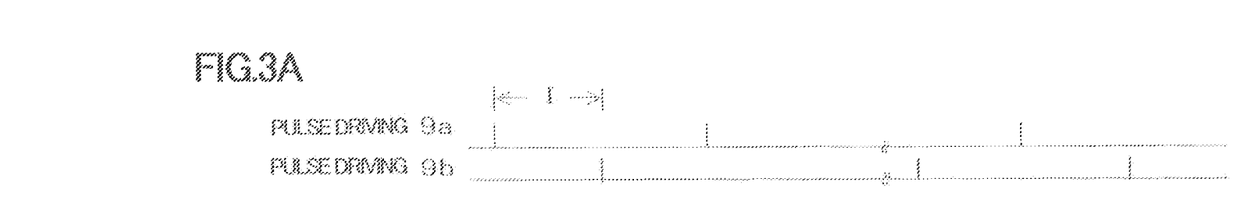
FIG. 3(A) is an explanatory drawing showing a driving state of a driving unit.
Figures 3B, 3C:
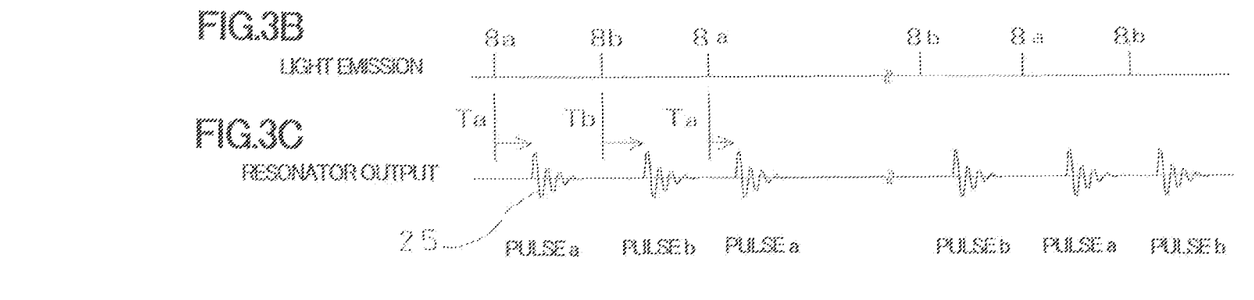
FIG. 3(B) is an explanatory drawing showing a light emission state of a pulse laser diode.
FIG. 3(C) is an explanatory drawing showing a state of the photodetection signal output from a resonator.

FIG. 3 show a state of the light emission of the PLDs 8a and 8b and a state of an output from the resonator 22 at the time of receiving each of the reflected pulsed distance measuring lights 10a' and 10b'. Further, since an operation of detecting the reflected pulsed distance measuring light 10' is equal to an operation of detecting the internal reference light 16, the operation where the reflected pulsed distance measuring light 10' has been detected will be described below.

Based on timing signals Ta and Tb from the timing generator 21, the pulse driving unit 9 allows the PLDs 8a and 8b to sequentially emit the lights at a predetermined time interval I (see FIGS. 3(A) and (B)). The pulsed distance measuring lights 10a and 10b respectively emitted from the PLDs 8a and 8b are projected in two directions 180° different from each other via the light projecting optical system 3 and the deflection member 11 and reflected by the object to be measured. The reflected pulsed distance measuring lights 10a' and 10b' reflected by the object to be measured enter to the light receiving unit 6 via the deflection member 11 and the light receiving optical system 4.

The reflected pulsed distance measuring lights 10a' and 10b' are received by the photodetection element 12 in a state including delay time ΔI respectively that each delay time ΔI is corresponding to each of measured distances. Furthermore, since the pulsed distance measuring lights 10a and 10b are emitted at the time interval I, the reflected pulsed distance measuring lights 10a' and 10b' detected by the photodetection element 12 are received with a time including the time interval I. Here, the time interval I is set to be sufficiently longer than the delay time ΔI.

Therefore, a signal output from the photodetection element 12 and the attenuation waveform 25 output from the resonator 22 are signals aligned in time series. Moreover, when these aligned signals are synchronized with the light emission timing (the timing signals Ta and Tb) of the pulse driving unit 9, it is possible to determine which aligned signal corresponds to the pulsed distance measuring light 10a or 10b respectively based on the order of the aligned signals.

Additionally, as shown in FIG. 3(C), the attenuation waveform 25 output from the resonator 22 is generated at a time point when a time required for going and returning from each of the timing signals Ta and Tb to the object to be measured (a transmission time) elapses. A time difference between a time point when each attenuation waveform turns to the 0 level for the first time and each of the timing signals Ta or Tb is determined and based on the time difference, the distance to the object to be measured can be determined. Further, like the internal reference light 16, a distance of an internal optical path is measured, and a distance to the object to be measured can be accurately obtained by subtracting a distance measurement result of the internal optical path from a distance measurement result of an external optical path.

As described above, since point group data in two directions can be substantially simultaneously obtained by the two PLDs 8a and 8b, the point group data in the wide range can be acquired in a short time, and the double point group density can be obtained by adopting a light emission duty ratio and a scan speed which are equivalent to a light emission duty ratio and a scan speed in the conventional technology.

Further, the light emission duty ratio (Duty=a light emission time/a light emission time interval) (e.g., 0.01%) is determined for each of the PLDs 8a and 8b, and the light emission exceeding the specified duty ratio results in the damage or the deterioration of the pulse laser diodes. In the present embodiment, since the two PLDs 8 are used to acquire the point group data, the density growth of the point group data can be realized without increasing the light emission duty ratio.

Furthermore, when the deflection member 11 is subjected to the constant-speed rotation at a predetermined speed, the point group data in the entire circumferential direction can be obtained. Moreover, a rotating angle of the deflection member 11 is detected by an angle detector (not shown) such as an encoder. Since the rotating angle of the deflection member 11 is associated with the projecting directions of the pulsed distance measuring lights 10a and 10b, a direction of each measuring point can be measured, whereby the distance measuring data and the direction at each measuring point can be associated with each other.

Further, when the laser surveying instrument 1 is mounted in a moving object such as an automobile and moved in a direction of the optical axis 13 or in a direction perpendicular to a page surface (see FIG. 1), the point group data around a traveling path can be acquired. Further, when a GPS and a compass which detects a projecting direction of the pulsed distance measuring light 10 are mounted in the moving object to measure a position of a ground coordinate system of the moving object and also to measure a direction of the measuring point, the three-dimensional point group data at an absolute coordinate of the object to be measured can be obtained.

It is to be noted that the pulsed distance measuring light 10 is divided into the pulsed distance measuring lights 10a and 10b to be projected in two directions in the above embodiment, but the two PLDs 8a and 8b emit the pulsed distance measuring lights 10a and 10b in a time sharing manner, and hence the pulsed distance measuring lights 10a and 10b may be projected in the same direction by the deflection member 11 having one reflection surface.

Figure 4:
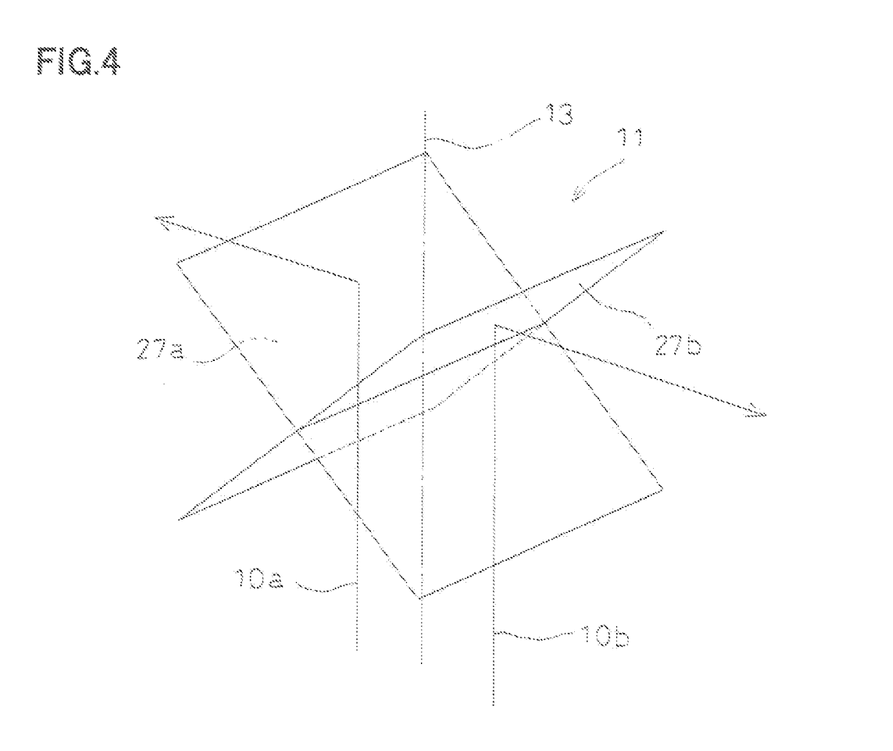
FIG. 4 is a schematic perspective view of a deflection member which divides and deflects the pulsed distance measuring lights having two wavelengths in two directions.

FIG. 4 shows an example of the deflection member 11. Although FIG. 4 shows a configuration based on a reflection mirror, a reflection surface of the reflection mirror alone is shown to facilitate the understanding. Furthermore, the deflection member 11 is configured to rotate around the vertical optical axis 13.

Two reflection surfaces 27a and 27b tilt 45° with respect to the vertical, and these surfaces are perpendicular to each other.

The pulsed distance measuring light 10a passes through the reflection surface 27b, is then reflected by the reflection surface 27a, and is projected in the horizontal direction. Moreover, the pulsed distance measuring light 10b passes through the reflection surface 27a, is then reflected by the reflection surface 27b, and is projected in the horizontal direction.

Figure 5:
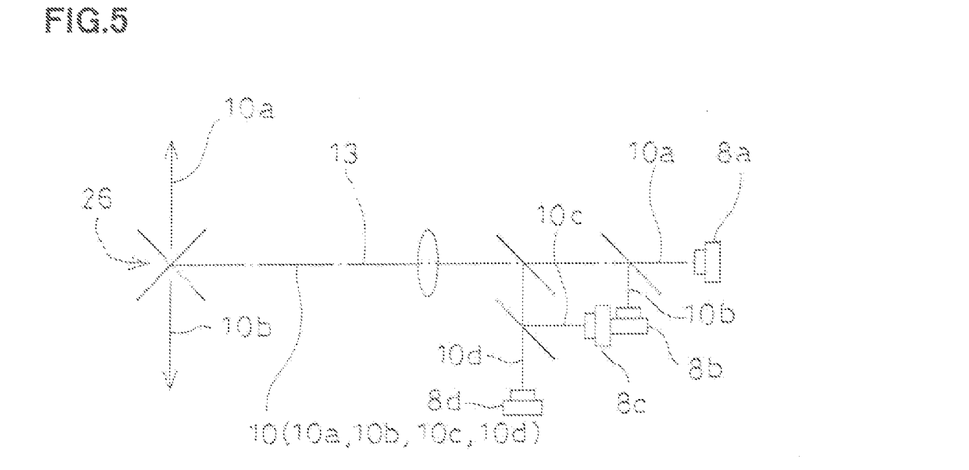
FIG. 5 shows a second embodiment and is a schematic view of a light projecting optical system which divides and deflects the pulsed distance measuring lights having four wavelengths in four directions.

FIG. 5 shows a light projecting optical system 3 according to a second embodiment.

In the second embodiment, PLDs 8a, 8b, 8c, and 8d for emitting pulsed distance measuring lights 10a, 10b, 10c, and 10d which have each different wavelength, respectively are provided. The pulsed distance measuring lights 10a, 10b, 10c, and 10d are configured to be divided by a deflection member 26 with four reflection surfaces for every wavelength and to be projected in four directions. It is to be noted that the wavelengths of the pulsed distance measuring lights 10a, 10b, 10c, and 10d are, e.g., 900 nm, 850 nm, 800 nm, and 750 nm.

Figure 6:
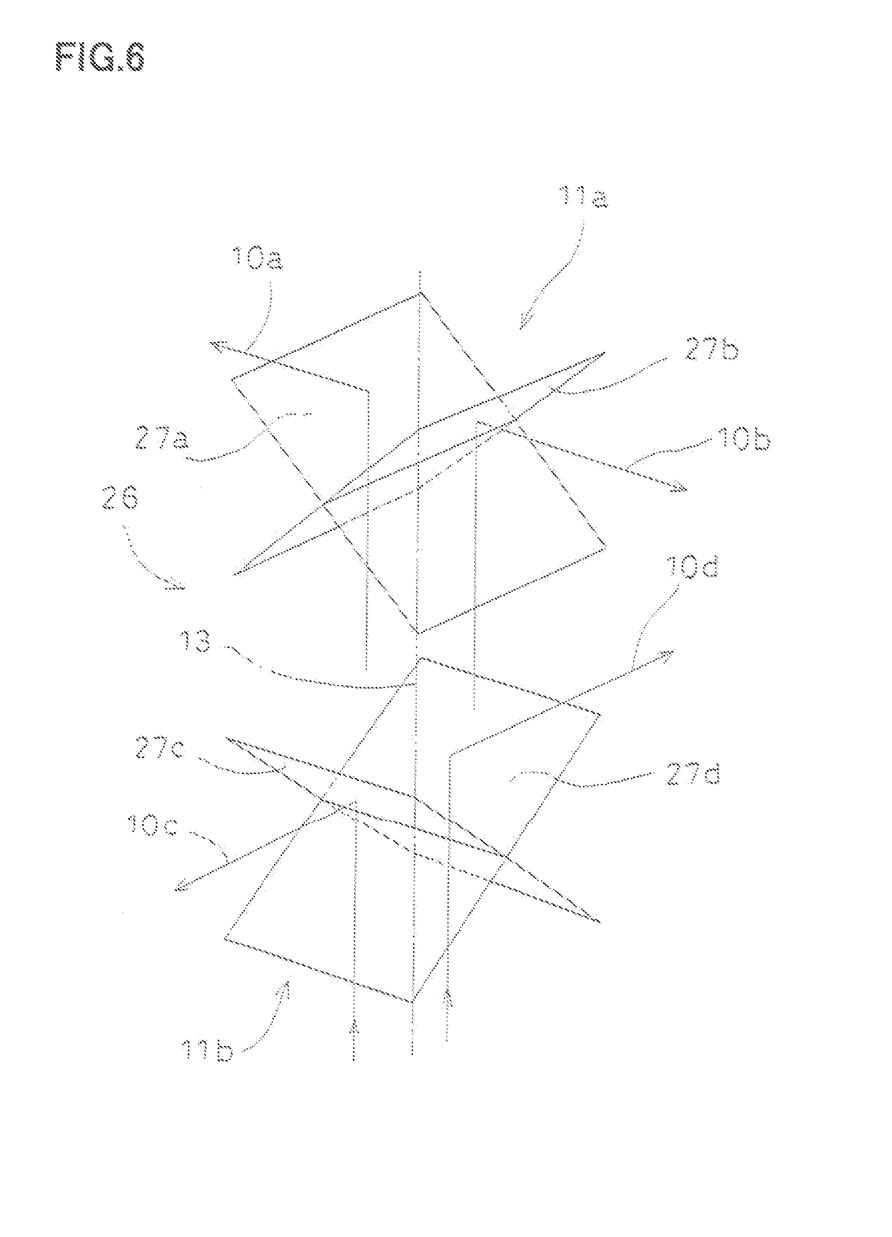
FIG. 6 is a schematic perspective view showing an example of a deflection member which is used in the second embodiment and divides the pulsed distance measuring lights in four directions.

FIG. 6 shows the deflection member 26 which divides and deflects the pulsed distance measuring lights 10a, 10b, 10c, and 10d in four directions. Also in FIG. 6, to facilitate the understanding, reflection surfaces of reflection mirrors alone are shown. Further, the deflection member 26 is a combination of a deflection member 11a and a deflection member 11b, and the deflection member 11a and the deflection member 11b are provided on the optical axis 13 and arranged to be apart from each other at a predetermined interval along the optical axis 13. Furthermore, the deflection members 11a and 11b are configured to rotate around the optical axis 13 in the vertical direction.

The deflection member 11a has two reflection surfaces 27a and 27b and the deflection member 11b has two reflection surfaces 27c and 27d. The four reflection surfaces tilt 45° with respect to the vertical, the reflection surfaces 27a and 27b are perpendicular to each other, and the reflection surfaces 27c and 27d are perpendicular to each other. Moreover, the deflection member 11a and the deflection member 11b are arranged in such a manner that their directions are 90° different from each other with the optical axis 13 at the center.

On the reflection surfaces 27a and 27b and the reflection surfaces 27c and 27d, the wavelength selection films are formed respectively, and each of the respective reflection surfaces 27a, 27b, 27c, and 27d reflects the different wavelengths. For example, the reflection surface 27a reflects a wavelength of 900 nm±20 nm and transmits the other wavelengths therethrough, the reflection surface 27b reflects a wavelength of 850 nm±20 nm and transmits the other wavelengths therethrough, the reflection surface 27c reflects a wavelength of 800 nm±20 nm and transmits the other wavelengths therethrough, and the reflection surface 27d reflects a wavelength of 750 nm±20 nm and transmits the other wavelengths therethrough.

Therefore, the pulsed distance measuring lights 10a, 10b, 10c, and 10d are divided and reflected by a total of four reflection surfaces, i.e., the reflection surfaces 27a and 27b and the reflection surfaces 27c and 27d, reflected in directions which are 90° different in the horizontal direction, and projected in a radial pattern. The pulsed distance measuring lights 10a', 10b', 10c', and 10d' reflected by the object to be measured in four directions enter the light receiving unit 6 (see FIG. 1) via the deflection member 11a and the deflection member 11b.

Figure 7:
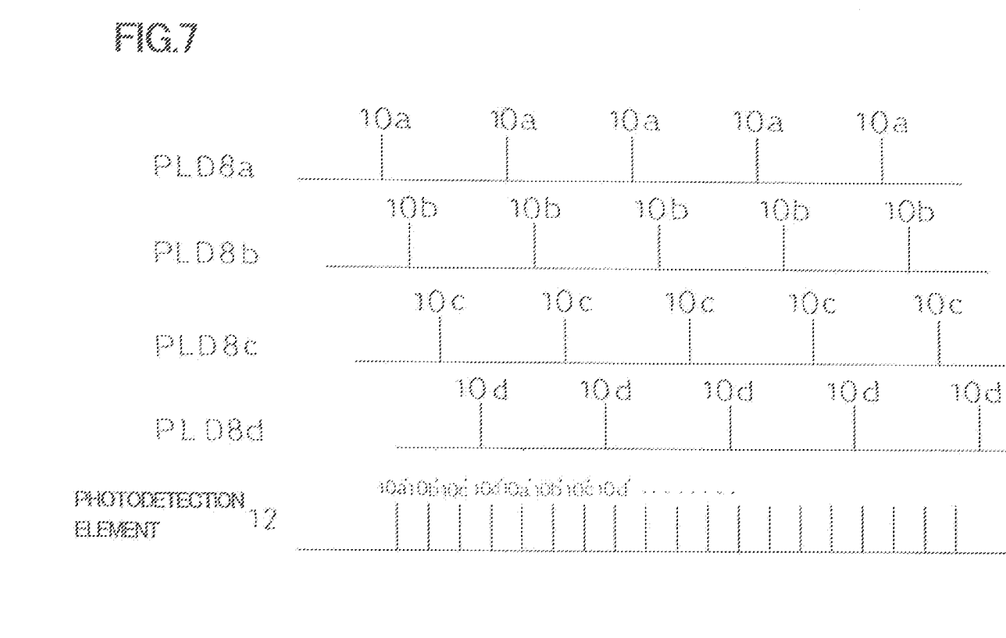
FIG. 7 is an explanatory drawing showing the light emission timing of a light source unit which emits the pulsed distance measuring lights having four wavelengths.

FIG. 7 shows the light emission timing of each of the PLDs 8a, 8b, 8c, and 8d and the photodetection signal 24 from the photodetection element 12.

The PLDs 8a, 8b, 8c, and 8d are caused to sequentially emit the lights by the pulse driving unit 9 (see FIG. 1) at a predetermined time interval I in the order of the PLDs 8a, 8b, 8c, and 8d. The reflected pulsed distance measuring lights 10a', 10b', 10c' and 10d' enter the photodetection element 12 (see FIG. 1) in the mentioned order, and the photodetection signals corresponding to the reflected pulsed distance measuring lights 10a', 10b', 10c' and 10d' are transmitted.

For example, since it is good enough for the PLD 8a to emit the light once in four times, if a light emission duty ratio of the PLD 8a is equal to a light emission duty ratio in the conventional technology, a light emission frequency of a light emission unit 2 (see FIG. 1) increases by four times. Therefore, the point group data can be acquired with a density of four times.

Additionally, a scan speed consequently increases by four times by rotating the deflection member 26.

Further, although not shown, a deflection member 11c (not shown) is added to the lower side of the deflection member 11b to provide the deflection member 26 with a three-stage structure, the deflection member 11a, the deflection member 11b, and the deflection member 11c are rotated every 60° in the horizontal direction and installed in this state, and the six PLDs are provided to enable the pulsed distance measuring lights having the different wavelengths to enter to the respective reflection surfaces, whereby the pulsed distance measuring lights 10 can be projected in a radial pattern at an equiangular pitch in six directions, the light emission frequency is consequently increased by six times, and the scan speed is increased by six times by rotating the deflection member 26.

Figure 8:
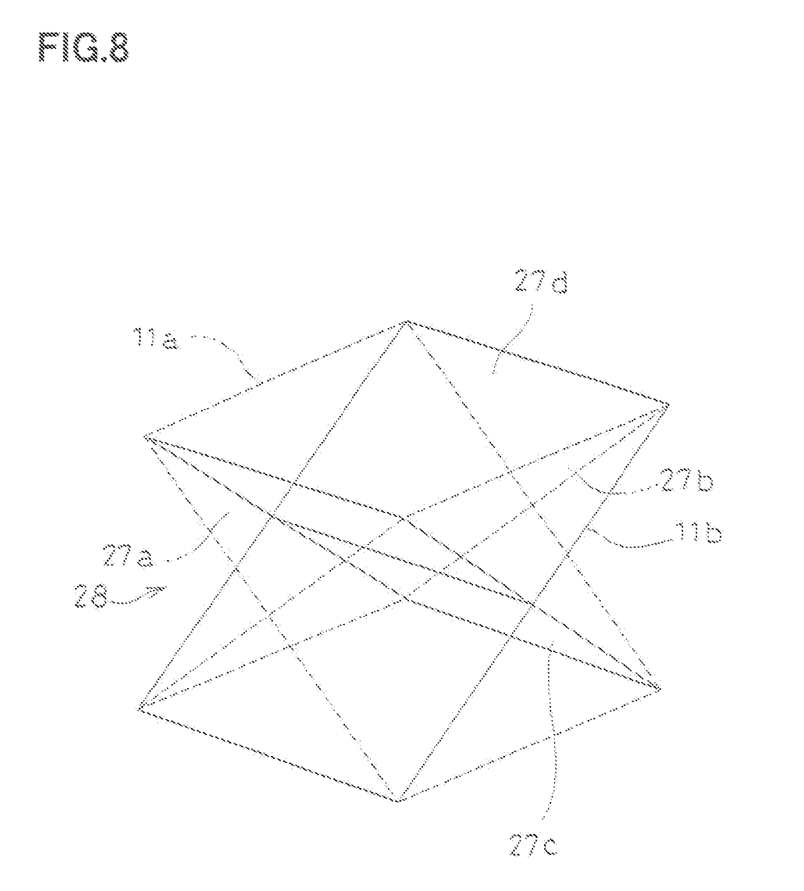
FIG. 8 is an explanatory drawing showing another example of the deflection member which divides the pulsed distance measuring lights in four directions.

FIG. 8 shows a deflection member 28 according to another example, and the deflection member 28 is obtained by integrating the deflection member 11a and the deflecting member 11b depicted in FIG. 6. In FIG. 8, the same components as shown in FIG. 6 are referred by the same symbol.

In FIG. 8, a part indicated by a broken line corresponds to the deflection member 11a in FIG. 6, and a part indicated by a solid line corresponds to the deflection member 11b. When these members are integrated, the deflection member 28 is reduced in size, and a laser surveying instrument 1 is also reduced in size.

Figures 9, 10:
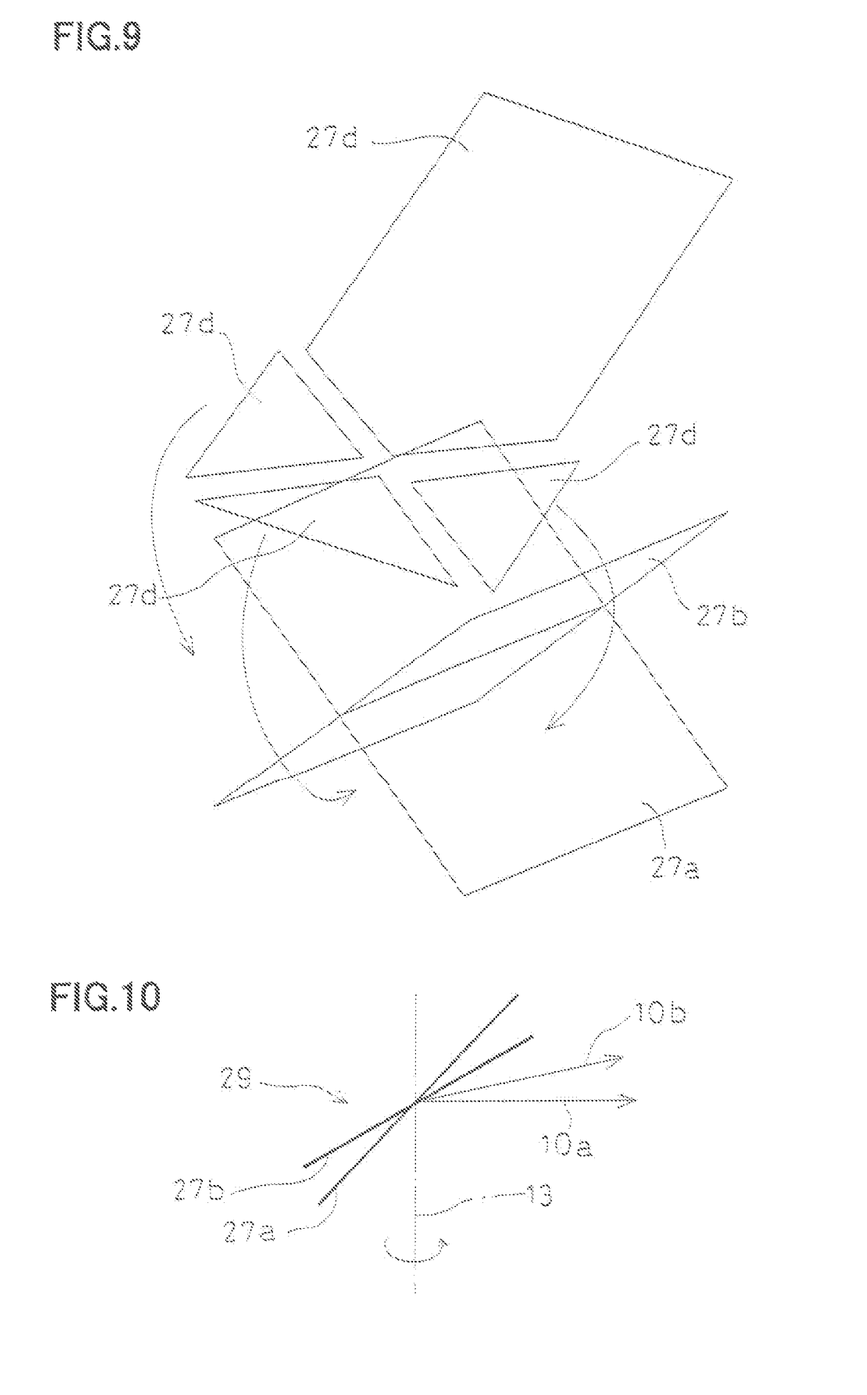
FIG. 9 is an exploded perspective view of the deflection member according to the above another example.
FIG. 10 is an explanatory drawing showing still another example of the deflection member.

FIG. 9 shows a structure for integrating the deflection member 11a with the deflection member 11b and shows a state that the deflection member 11b is added to the deflection member 11a to be assembled, and a reflection surface 27d is divided into four pieces and incorporated into portions indicated by arrows respectively which are sandwiched between a reflection surface 27a and a reflection surface 27b. Although a reflection surface 27c is not shown, this surface is likewise divided and incorporated into portions sandwiched between the reflection surface 27a and the reflection surface 27b.

It is to be noted that a situation where the deflection member 28 is constituted of a planar mirror, but it may be constituted of a prism so as to form the reflection surfaces 27a, 27b, 27c, and 27d.

FIG. 10 shows still another example of a deflection member 29 and shows a situation where the deflection member 29 has two reflection surfaces 27a and 27b and each of pulsed distance measuring lights 10a and 10b is divided into two for every wavelength.

The deflection member 29 is provided in such a manner that the reflection surfaces 27a and 27b tilt in the same direction with respect to an optical axis 13 and cross each other with different elevation angle, and wavelength selection films corresponding to the wavelengths of the pulsed distance measuring lights 10a and 10b are formed on these reflection surfaces, respectively.

In the deflection member 29, by the reflection surfaces 27a and 27b, the pulsed distance measuring lights 10a and 10b are divided, deflected in the same direction (the same horizontal angle), and reflected to be projected with different vertical angles (different height directions).

In the deflection member 11, the two measuring points of object to be measured in the same direction (the same horizontal angle), which have different heights, can be simultaneously measured.

It is to be noted that the deflection member 29 shown in FIG. 10 can be combined with the other deflection members, and the deflection member 29 can be combined with, e.g., the deflection member 11 depicted in FIG. 4. That is, when a reflection surface 27a' having a different elevation angle is provided with respect to the reflection surface 27a, and a reflection surface 27b' having a different elevation angle is provided with respect to the reflection surface 27b, the two pulsed distance measuring lights 10 each having different vertical angles can be projected respectively in two horizontal directions which are 180° different from each other. Additionally, in this case, as a light source unit 2 and the light projecting optical system 3, the members shown in FIG. 5 are used.

Figure 11:
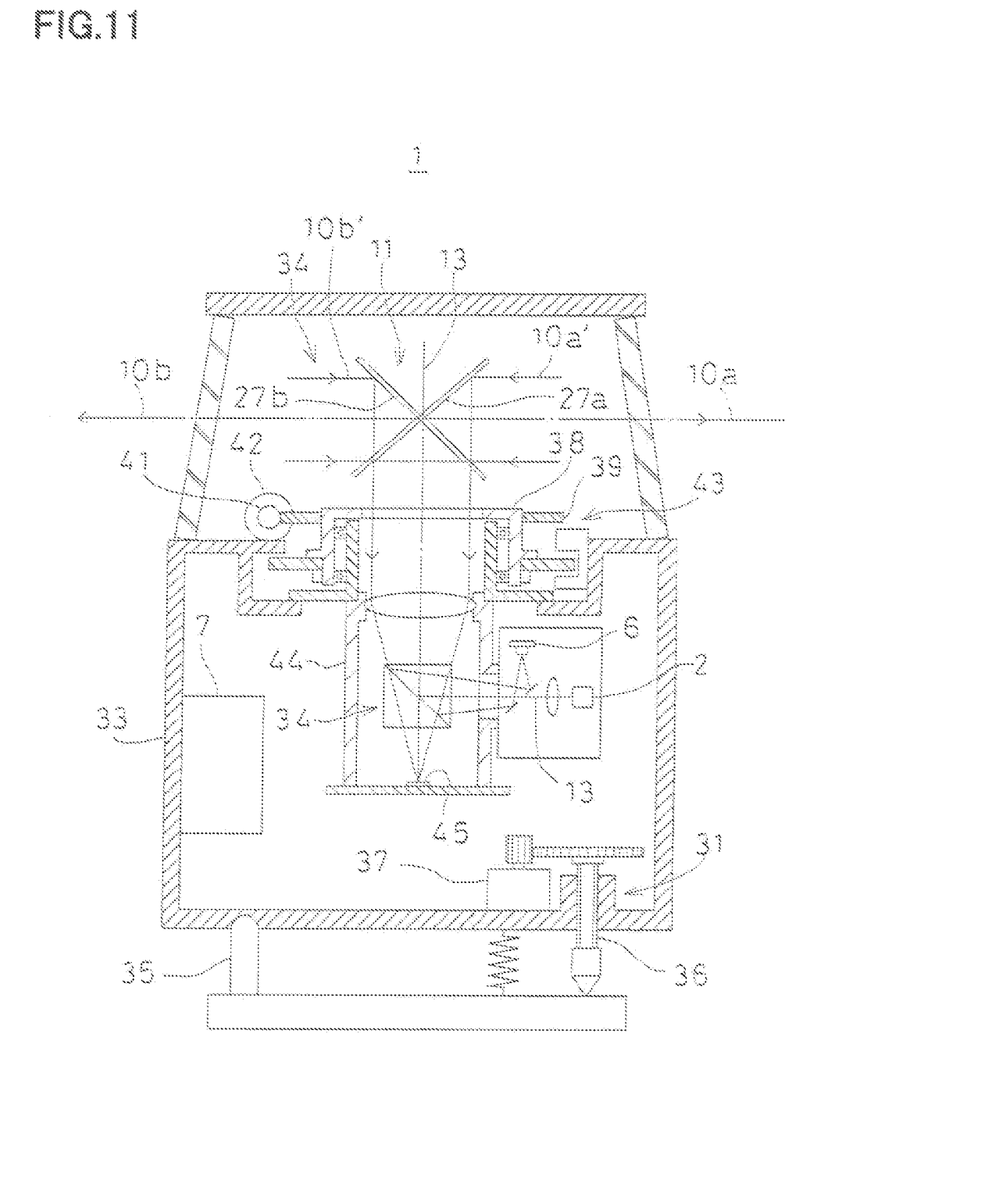
FIG. 11 is a cross-sectional view showing a specific example of a laser surveying instrument according to the present embodiment.

FIG. 11 shows an example of a laser surveying instrument 1 to which the present invention is applied. It is to be noted that, in FIG. 11, the same components as shown in FIG. 1 are referred by the same symbol, and detailed description is not given here. Further, the laser surveying instrument shown in FIG. 11 comprises a deflection member 11 which divides a pulsed distance measuring light 10 in two directions and projects the divided pulsed distance measuring lights.

The laser surveying instrument 1 is mainly constituted of a leveling unit 31, a measuring device main unit 33 supported by the leveling unit 31, and a distance measuring light projecting unit 34 provided on the measuring device main unit 33.

The leveling unit 31 has a pivot pin 35 which supports the measuring device main unit 33 so as to be tiltable in an arbitrary direction and has two adjusting screws 36 which are provided at other two vertices of a triangle if the pivot pin 35 is regarded as one vertex of the triangle, and the leveling of the laser surveying instrument 1 is performed by being rotated the adjusting screws 36 respectively by leveling motors 37.

The measuring device main unit 33 has a lens barrel 44 installed concentrically with a rotating shaft center of the measuring device main unit 33, and a light projecting optical system 3 and a light receiving optical system 4 are accommodated in the lens barrel 44 (see FIG. 1). An optical axis 13 of the light projecting optical system 3 and the light receiving optical system 4 coincides with the rotating shaft center.

An image photodetector 45 as an image pickup device is provided a bottom portion of the lens barrel 44. Further, a light source unit 2 and a light receiving unit 6 are integrally provided on a lateral side of the lens barrel 44.

A deflection unit holder 38 is rotatably provided at an upper end portion of the lens barrel 44, and the deflection member 11 equivalent to the deflection member shown in FIG. 4 is provided to the deflection unit holder 38. A driven gear 39 is provided to the deflection unit holder 38, and a driving gear 41 meshes with the driven gear 39. The driving gear 41 is fitted fixedly to an output shaft of a horizontal rotating motor 42, and the horizontal rotating motor 42 is fixed to an upper surface of the measuring device main unit 33. Furthermore, a horizontal angle detector, e.g., an encoder 43 is provided between the deflection unit holder 38 and the measuring device main unit 33 and the encoder 43 detects a rotating angle of the deflection unit holder 38, i.e., the deflection member 11.

The deflection member 11 is a constituent element common to the light projecting optical system 3 and the light receiving optical system 4, and the pulsed distance measuring lights 10a and 10b are divided and deflected in 180° different horizontal directions by the deflection member 11 to be projected to an object to be measured. Moreover, reflected pulsed distance measuring lights 10a' and 10b' from the object to be measured enter the deflection member 11 and are deflected downwards in the vertical direction by the deflection member 11. Further, the reflected pulsed distance measuring lights 10a' and 10b' are entered to the light receiving unit 6 by the light receiving optical system 4 (see FIG. 1).

The light receiving unit 6 produces photodetection signals by receiving the reflected pulse distance measuring lights 10a' and 10b', and measurement of a distance is performed based on a light receiving result of the light receiving unit 6.

Further, the deflection member 11 is rotated by the horizontal rotating motor 42, whereby the point group data in the total circumferential direction can be obtained. Projecting directions of the pulsed distance measuring lights 10a and 10b are detected by the encoder 43, associated with a distance measuring result and stored. It is to be noted that, although not shown, when a position measuring device such as a GPS is provided, a measuring result of a ground coordinate is likewise associated with the distance measuring result.

It is to be noted that, when the laser surveying instrument 1 is provided in a moving object, this instrument is provided in such a manner that the optical axis 13 is set to be substantially horizontal and the optical axis 13 coincides with an advancing direction, the deflection member 11 projects the pulsed distance measuring lights 10a and 10b, and the moving object moves while reciprocating and rotating the deflection member 11 in the vertical direction at a predetermined angle. It is, therefore, possible to obtain the point group data in the range of a necessary height of a wayside along which the moving object moves.

It is to be noted that the moving object may be moved while rotating the deflection member 11 in the total circumferential direction.

Further, a cross line may be formed by crossing reflection surfaces 27a and 27b each other, and the defection member 11 alone may be rotated around the cross line (vertical to a page surface of FIG. 11) to detect a rotating angle by a rotating angle detecting means, e.g., an encoder. In this case, a rotation mechanism of the deflection unit holder 38 can be omitted. When the deflection member 11 alone is rotated, a weight of the rotating portion can be reduced, and a scan speed can be increased.

The invention claimed is:

1. A laser surveying instrument, comprising a light source unit which has two or more light emission sources for emitting pulsed distance measuring lights with different wavelengths, a pulse driving unit for performing time sharing and emitting said pulsed distance measuring lights for every wavelength, a light projecting unit for projecting said pulsed distance measuring lights with said two or more wavelengths on an optical axis, a deflection member which is provided on said optical axis, has two or more reflection surfaces which reflect each wavelength of said pulsed distance measuring lights alone, divides said pulsed distance measuring lights for every wavelength, and deflects each of said distance measuring lights to direct an object to be measured, and a single photodetection element for receiving reflected distance measuring lights from said object to be measured, wherein a measurement of distance is performed for every pulsed distance measuring light based on a photodetection signal produced by said photodetection element.

2. The laser surveying instrument according to claim 1, wherein said two or more reflection surfaces of said deflection member tilt with respect to said optical axis, and said reflection surfaces have tilt angles which are different from each other.

3. The laser surveying instrument according to claim 1 or claim 2, wherein said two or more reflection surfaces of said deflection member divide and deflect said pulsed distance measuring lights so as to have different horizontal angles.

4. The laser surveying instrument according to claim 1 or claim 2, wherein said two or more reflection surfaces of said deflection member divide and deflect said pulsed distance measuring lights so as to have different vertical angles.

5. The laser surveying instrument according to claim 1 or claim 2, wherein said deflection member has said two reflection surfaces, and said reflection surfaces cross each other and symmetrically tilt with respect to said optical axis.

6. The laser surveying instrument according to claim 5, wherein said deflection member is provided on two or more stages along said optical axis in such a manner that one deflection member is placed at a position rotated around said optical axis from the other deflection member.

7. The laser surveying instrument according to claim 3, wherein said deflection member has said four reflection surfaces, and said reflection surfaces are formed to cross each other and each of said reflection surfaces has different horizontal direction, respectively.

8. The laser surveying instrument according to claim 7, wherein said reflection surface is formed by a planar mirror.

9. The laser surveying instrument according to claim 7, wherein said reflection surface is formed by a prism.

10. The laser surveying instrument according to claim 1 or claim 2, wherein said deflection member is rotatable around said optical axis and a horizontal angle detector, which detects a rotational angle of said deflection member, is provided, and wherein said horizontal angle detector detects a projecting direction of said pulsed distance measuring light, and said detected projecting direction is associated with a distance measurement result.

* * * * *

UNITED STATES PATENT AND TRADEMARK OFFICE
CERTIFICATE OF CORRECTION

| | | |
|---|---|---|
| PATENT NO. | : 8,643,828 B2 | Page 1 of 1 |
| APPLICATION NO. | : 13/276519 | |
| DATED | : February 4, 2014 | |
| INVENTOR(S) | : Ohtomo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 111 days.

Signed and Sealed this
Twelfth Day of May, 2015

Michelle K. Lee
*Director of the United States Patent and Trademark Office*